US011323571B1

(12) United States Patent
Johnston, Jr.

(10) Patent No.: US 11,323,571 B1
(45) Date of Patent: May 3, 2022

(54) MESSAGE MANAGEMENT SYSTEM (71) Applicant: Securus Technologies, Inc., Carrollton, TX (US)

(72) Inventor: Kenneth D. Johnston, Jr., Wylie, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 15/842,257

(22) Filed: Dec. 14, 2017

(51) Int. Cl.
| | |
|---|---|
| *H04L 12/58* | (2006.01) |
| *H04M 3/53* | (2006.01) |
| *H04M 3/533* | (2006.01) |
| *H04L 65/4038* | (2022.01) |
| *H04M 3/487* | (2006.01) |
| *H04N 7/15* | (2006.01) |

(52) U.S. Cl.
CPC ...... *H04M 3/5307* (2013.01); *H04L 65/4038* (2013.01); *H04M 3/487* (2013.01); *H04M 3/53366* (2013.01); *H04N 7/155* (2013.01)

(58) Field of Classification Search
CPC ....... H04M 2203/4509; H04M 1/2471; H04M 2203/45; H04M 2215/2073; H04M 2215/208; H04M 220/4509; H04W 4/12; H04W 4/14; H04W 88/185
USPC .................. 455/410, 411, 412.1, 412.2, 413
See application file for complete search history.

(56) References Cited

U.S. PATENT DOCUMENTS

| | | | | |
|---|---|---|---|---|
| 5,751,791 | A * | 5/1998 | Chen ....................... | H04L 29/06 348/14.06 |
| 6,836,548 | B1 * | 12/2004 | Anderson ............... | G06F 21/72 380/255 |
| 7,496,628 | B2 * | 2/2009 | Arnold ................. | G06Q 10/107 709/204 |
| 9,473,497 | B1 * | 10/2016 | Smith ..................... | H04L 63/10 |
| 9,912,821 | B1 * | 3/2018 | Hodge ................ | H04M 15/775 |
| 9,924,135 | B1 * | 3/2018 | Smith .................... | G06Q 50/00 |
| 2002/0131566 | A1 * | 9/2002 | Stark ..................... | H04L 51/066 379/88.19 |
| 2003/0190026 | A1 * | 10/2003 | Lemchen ................ | H04L 51/24 379/159 |
| 2003/0198325 | A1 * | 10/2003 | Bayne ................... | H04M 15/08 379/114.21 |
| 2005/0100151 | A1 * | 5/2005 | Lemchen ................ | H04L 51/24 379/159 |

(Continued)

*Primary Examiner* — Suhail Khan
(74) *Attorney, Agent, or Firm* — Fogarty LLP (57) ABSTRACT

Systems and methods provide a resident of a controlled-environment facility with a visitation service that include messaging capabilities, where the message are managed on behalf of the resident based on the visitation sessions in which the resident participates. In one scenario, the resident issues an initial visitation request for a visitation session with a particular non-resident. In response to the non-resident not accepting this initial visitation request, the resident is allowed to record and store a message, such as a voice message or video message, for retrieval and playback by the non-resident. At a later time, the resident issues a second visitation request for a visitation session with the same non-resident. The non-resident accepts the second request and the requested visitation session between the non-resident and the resident is conducted. In response to the visitation session being conducted, the stored message may be marked for deletion.

20 Claims, 5 Drawing Sheets

(56) References Cited

U.S. PATENT DOCUMENTS

| | | | | |
|---|---|---|---|---|
| 2006/0187020 | A1* | 8/2006 | Smithkovec-Chilton | .................... A47G 29/122 340/531 |
| 2007/0041535 | A1* | 2/2007 | Forrest | .................. H04M 15/07 379/114.21 |
| 2010/0322403 | A1* | 12/2010 | Jackson | ................ H04M 7/006 379/211.02 |
| 2011/0243553 | A1* | 10/2011 | Russell | ............. G06Q 30/0631 398/25 |
| 2013/0194377 | A1* | 8/2013 | Humphries | ......... H04L 65/1076 348/14.08 |
| 2013/0263227 | A1* | 10/2013 | Gongaware | ............. H04L 63/08 726/4 |
| 2013/0275530 | A1* | 10/2013 | Matson | .................. H04L 51/24 709/206 |
| 2014/0267540 | A1* | 9/2014 | Torgersrud | ........ H04M 3/42374 348/14.01 |
| 2014/0282896 | A1* | 9/2014 | Torgersrud | ............. H04W 4/12 726/4 |
| 2016/0309233 | A1* | 10/2016 | Liu | ...................... H04N 21/231 |
| 2017/0193182 | A1* | 7/2017 | Mihai | .................... G16H 80/00 |

\* cited by examiner

MESSAGE MANAGEMENT SYSTEM

TECHNICAL FIELD

The following description relates generally to communication services provided to residents of a controlled environment facility, and more particularly to messaging services provided to residents of a controlled environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may have opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide other types of visitation sessions, including video conferences, email and online chat sessions.

Communication services provided to residents of controlled-environment facilities typically limit residents to placing outbound calls to non-residents of the controlled-environment facility because many controlled-environment facilities do not allow residents to receive incoming calls in form. In addition, residents typically have limited access to communication devices that are only provided according to strict schedules maintained by each individual controlled-environment facility. In some scenarios, voice visitation sessions between a resident and a non-resident may be scheduled for a time when the resident will have access to a communication device and when the non-resident is expected to be available to receive the call.

In many instances, visitation sessions between a resident and non-resident depend on a non-resident being able to receive the resident's visitation request at the time the resident is afforded the opportunity to initiate such a request. Consequently, in many instances, a resident's communication request is unsuccessful due to the inability of the non-resident to accept the resident's call request. In order to address these difficulties, certain controlled-environment facilities may provide residents with the ability to communicate with non-residents via audio or video messages. For instance, a resident may be allowed to record an audio or video message for retrieval by a particular non-resident. This recorded message is stored and may then be retrieved and played by at a later time by the non-resident. In certain scenarios, a non-resident may be similarly allowed to record an audio or video message for later retrieval by a resident.

The recorded messages may be stored for a duration of time that allows the nonresident to access and play the message. In addition, the information in a recorded messages may become stale based on visitation sessions that provide an opportunity for communication of the same information in a recorded message. Such messages including redundant information are likely to remain un-accessed by the nonresident, especially if payment is required to access the stored message. As such, certain recorded messages consume storage space but are unlikely to contain useful information and are thus maintained and stored unnecessarily.

BRIEF SUMMARY

According to various embodiments, a system provides a resident of a controlled-environment facility with messaging. The system includes a visitation request system configured to initiate a first visitation request on behalf of the resident for a first visitation session with a non-resident; determine that the non-resident has not accepted the first visitation request; initiate a second visitation request on behalf of the resident for a second visitation session with the non-resident, wherein the second visitation request is initiated after the resident records a message for the non-resident in response to the non-resident not accepting the first visitation request; and determine that the non-resident has accepted the second visitation request. The system further includes a communications system configured to host the second visitation session in response to the non-resident accepting the second visitation request. The system further includes a message service configured, in response to determining the first visitation request has not been accepted by the non-resident, to allow the resident to record the message for the non-resident and to store the recorded message and further configured to delete the stored message upon determining the second visitation session has been conducted.

In certain additional embodiments of the system, the first visitation request and the second visitation request are initiated by dialing a phone number associated with the non-resident. In certain additional embodiments of the system, the recorded message comprises at least one of an audio message and a video message. In certain additional embodiments of the system, the message service is further configured to determine whether the stored message has been accessed by the non-resident, wherein the stored message is not deleted if the stored message has been played by the non-resident. In certain additional embodiments of the system, the message service is further configured to determine whether a fee has been paid for the storage of the message, wherein the stored message is not deleted if the fee has been paid. In certain additional embodiments of the system, the message service is further configured to delete an additional stored message recorded by the resident for the non-resident upon determining the second visitation session has been conducted, wherein the additional stored message has not been accessed by the non-resident and a storage fee has not been paid for the additional stored message.

According to various additional embodiments, a method provides a resident of a controlled-environment facility with messaging. The method includes initiating a first visitation request on behalf of the resident for a first visitation session with a non-resident; determining that the non-resident has not accepted the first visitation request; storing a message recorded by the resident for the non-resident in response to determining the first visitation request has not been accepted by the non-resident; initiating a second visitation request on behalf of the resident for a second visitation session with the non-resident; determining that the non-resident has accepted the second visitation request; hosting the second visitation session in response to the non-resident accepting the second visitation request; and deleting the stored message upon determining the second visitation session has been conducted.

In certain additional embodiments of the method, the first visitation request and the second visitation request are initiated by dialing a phone number associated with the non-resident. In certain additional embodiments of the method, the recorded message comprises at least one of an audio message and a video message. In certain additional embodiments, the method further includes determining whether the stored message has been accessed by the non-resident, wherein the stored message is not deleted if the stored message has been played by the non-resident. In certain additional embodiments, the method further includes determining whether a fee has been paid for the storage of the message, wherein the stored message is not deleted if the fee has been paid. In certain additional embodiments, the method further includes deleting an additional stored message recorded by the resident for the non-resident upon determining the second visitation session has been conducted, wherein the additional stored message has not been accessed by the non-resident and a storage fee has not been paid for the additional stored message. In certain additional embodiments, the method further includes updating the storage of the stored message to indicate the stored message has been played by the non-resident.

According to various additional embodiments, a computer-readable storage device includes program instructions stored thereon for providing a resident of a controlled-environment facility with messaging. The program instructions cause processors to initiate a first visitation request on behalf of the resident for a first visitation session with a non-resident; determine that the non-resident has not accepted the first visitation request; store a message recorded by the resident for the non-resident in response to determining the first visitation request has not been accepted by the non-resident; initiate a second visitation request on behalf of the resident for a second visitation session with the non-resident; determine that the non-resident has accepted the second visitation request; host the second visitation session in response to the non-resident accepting the second visitation request; and delete the stored message upon determining the second visitation session has been conducted.

In certain additional embodiments of the storage device, the first visitation request and the second visitation request are initiated by dialing a phone number associated with the non-resident. In certain additional embodiments of the storage device, the recorded message comprises at least one of an audio message and a video message. In certain additional embodiments of the storage device, the program instructions further cause the processors to determine whether the stored message has been accessed by the non-resident, wherein the stored message is not deleted if the stored message has been played by the non-resident. In certain additional embodiments of the storage device, the program instructions further cause the processors to determine whether a fee has been paid for the storage of the message, wherein the stored message is not deleted if the fee has been paid. In certain additional embodiments of the storage device, the program instructions further cause the processors to delete an additional stored message recorded by the resident for the non-resident upon determining the second visitation session has been conducted, wherein the additional stored message has not been accessed by the non-resident and a storage fee has not been paid for the additional stored message. In certain additional embodiments of the storage device, the program instructions further cause the processors to update the storage of the stored message to indicate the stored message has been played by the non-resident.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled environment facilities and their respective residents (e.g., a hospital and its patients, a school dormitory and its students, etc.).

Figure 1:
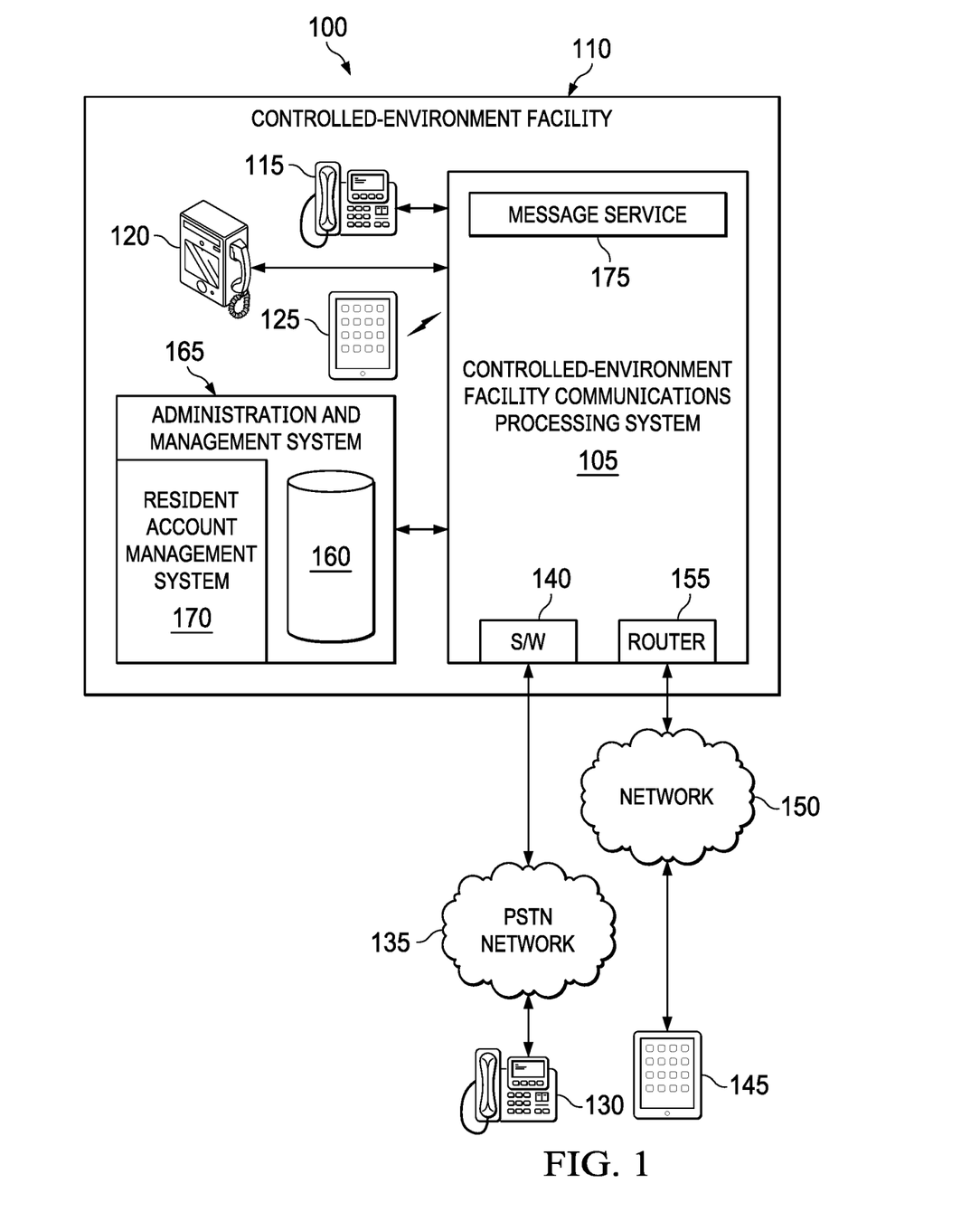
FIG. 1 is a diagram illustrating certain components of a voice communication system for providing residents of a controlled environment facility with voice messaging services according to various embodiments.

FIG. 1 is a diagram illustrating certain components of a communications system 100 provided within a controlled environment facility 110 according to various embodiments. As illustrated, the communications system 100 includes a communications processing system 105. In a controlled-environment facility 110, the communications processing system 105 may be a system that provides inmates with multiple different communications services. For instance, communications processing system 105 may provide inmates with voice visitation services, video visitation services, email, online chats and/or text messaging services. In certain embodiments, the communications processing system 105 may alternatively or additionally provided various messaging capabilities via a social networking service, such as the messaging capabilities provided to FACEBOOK account holders.

In some scenarios, such as the embodiment illustrated in FIG. 1, communications processing system 105 may be co-located within a controlled-environment facility 110. Alternatively, communications processing system 105 may be centrally and/or remotely located with respect to one or more controlled-environment facilities. Whether co-located or located remotely, communications processing system 105 may be used to provide communication services to inmates of multiple controlled-environment facilities. As described with respect to FIG. 5, in various embodiments, communications processing system 105 may assume a variety of forms.

In certain embodiments, residents of a controlled-environment facility 110 may use conventional telephones 115 to access certain voice communication services provided by the communications processing system 105. In various scenarios, conventional telephones 115 may be provided only to certain residents and/or in certain visitation areas provided by the controlled-environment facility 110. In certain embodiments, certain voice calls by staff of the controlled-environment facility 110 may be conducted using conventional telephones 115 that also utilize the communications processing system 105.

In many embodiments, the communications processing system 105 may provide residents of the controlled-environment facility 110 with voice and/or video communications services using a resident communications terminal 120. In certain scenarios, the resident communications terminal 120 may be mounted on a wall, within a booth, or as part of kiosk. In certain scenarios, the resident communications terminal 120 may be a hardened terminal and may be installed in an area of the controlled-environment facility 110 dedicated to providing residents with visitation sessions. In certain embodiments, resident communications terminal 120 may provide a resident with the ability to participate in voice calls and to participate in video visitation sessions. In certain embodiments, such a resident communications terminal 120 may be referred to as an Intelligent Facility Device (IFD), which may be a video phone particularly adapted for use in a controlled-environment facility. An IFD may be adapted to provide residents with various additional services in addition to voice and video visitation sessions.

In various embodiments, a resident communications terminal 120 may include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on the resident communications terminal 120 may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a speaker), a handle portion, and a mouthpiece portion (with a microphone). In certain embodiments, the resident communications terminal 120 may allow a resident to utilize a headset with earphones and a microphone in place of a traditional handset.

Resident communications terminal 120 may be configured to capture audio from the resident and transmitting the captured audio to a non-resident via the communications processing system 105. The resident audio may be captured using a microphone in the mouthpiece portion of the handset or by a microphone component of a headset. The resident communications terminal 120 receives an audio signal from the non-resident, via the communications processing system 105, and plays the received audio for the resident using the earpiece portion of the handset. In certain resident communications terminals 120, audio received from the non-resident may be played for the resident via a speaker or via earphones. During a video visitation session, resident communications terminal 120 may be configured to capture video or images of the resident using the camera and, via the communications processing system 105, transmit the captured video or images to a non-resident. Resident communications terminal 120 may be further configured to display video or images received from non-resident communication device 145 via the communications processing system 105.

In certain embodiments, the communications processing system 105 may provide residents of the controlled-environment facility 110 with communication services using a portable communications device 125. In certain embodiments, portable communications device 125 may be a personal wireless devices, such as a tablet computing device or smartphone device. Similar to the resident communications terminal 120, the portable communications device 125 may likewise include a camera, display, microphone and speakers and may be used both for voice visitation sessions and video visitation sessions. In certain scenarios, a portable communications device 125 may be referred to as an Intelligent Resident Device (IRD), or in a correctional institution environment, as an Intelligent Inmate Device (IID). In certain scenarios, a portable communications device 125 and/or a resident communications terminal 120 may be sponsored, or otherwise subsidized, by organizations or companies that have contracted with the controlled-environment facility 110 to provide communication services to residents of the facility.

In many scenarios, the portable communications device 125 may be especially adapted for use in a controlled-environment facility. For instance, in a correctional facility, the portability of a portable communications device 125 may be limited by mounting the device on a wall, within a booth or as part of a kiosk. In certain scenarios, the portable communications device 125 may be protected within a hardened case that prevents any modifications to the hardware of the device. Various features of the hardware and/or software of the portable communications device 125 may be modified in order to prevent unauthorized use of the device. For instance, in a correctional institution, a portable communications device 125 may operate using a specially adapted operating system or operating system kernel. A portable communications device 125 may also be restricted with respect to the allowed software applications that may be used by a resident. The portable communications device 125 may also be configured to prevent the resident from installing or modifying any applications on the device, thus limiting the resident to the use of software programs authorized for use by the controlled-environment facility 110. The portable communication device 125 may be assigned for use by a resident on a temporary or permanent basis.

In various scenarios, a portable communications device 125 and/or a resident communications terminal 120 may provide a resident of the controlled-environment facility 110 with access to various software applications and services in addition to providing voice and video visitation sessions. For example, residents may be provided with legal research services, education services, employment search services, supervised email access, supervised online chat sessions, applications for playback of approved music and video files and/or supervised messaging. In certain scenarios, a portable communications device 125 and/or a resident communications terminal 120 may provide a resident with access to commissary services provided by the controlled-environment facility 110. In certain scenarios, portable communications device 125 and/or a resident communications terminal 120 may include a web browser which may be limited to only accessing secure websites and/or third party websites of approved vendors. Portable communications device 125 and/or a resident communications terminal 120 may also provide residents with access to various services specific to the controlled-environment facility 110, such as requesting a scheduled visitation session and requesting medical appointments.

A portable communications device 125 may also be restricted with respect to the network connectivity that is afforded to a resident of the controlled-environment facility. In many scenarios, a portable communications device 125 may be configured to connect only to a network provided by the controlled-environment facility 110. A portable communications device 125 may be further restricted to only connect to networks available within certain areas within a controlled-environment facility 110, such as a dedicated visitation area or other supervised area. In certain scenarios, network connectivity for a portable communications device 125 may be limited by placing wireless access points and positioning directional antenna within the physical structure of the controlled-environment facility 110 such that the generated wireless signals are restricted to limited areas within the facility.

In many scenarios, use of a resident communications terminal 120 and a portable communications device 125 is limited based on security protocols implemented by the controlled-environment facility 110. For instance, a resident may be required to enter a PIN (Personal Identification Number) before being allowed to use a resident communications terminal 120 or a portable communications device 125. A resident may similarly be required to provide biometric verification, such as using a voice print, fingerprint, facial recognition, iris scan or other biometric indicator. Access to specific applications and services provided by a resident communications terminal 120 and a portable communications device 125 may also be limited to residents based on security protocols, thus requiring addition verification, such as a password, prior to allowing access to a resident.

In the illustrated embodiment, the communications processing system 105 utilizes the administration and management system 165 in enforcing security protocols that are applicable to the use of communication services provided to residents of the controlled-environment facility 110. For instance, in providing visitation services, communication processing system 105 may limit a resident's visitation sessions to sessions with non-residents whose identities are listed in that resident's Pre-Approved Contact (PAC) and/or Personal-Allowed Number (PAN) list. In some scenarios, the communications processing system 105 may also enforce restrictions prohibiting a resident from contacting certain individuals identified in a "do not contact" list. In various scenarios, the identity of a non-inmate may be identified based on the phone number of the non-resident, the device presented for use by a non-resident and/or the email addresses or other accounts used by the non-resident. Each resident's PAC, PAN, and/or do not contact list(s) may be stored, for example, in database 160 maintained by the administration and management system 165. In certain scenarios, database 160 may also be used to store biometric information used to authenticate individual residents of the controlled-environment facility 110. In addition to PAC, PAN, and/or do not contact list(s), administration and management system 165 may also store other security profiles and rules that are applicable to each resident.

The administration and management system 165 may also include a resident account management system 170 that is used to manage information such as balances in a resident's trust, commissary and/or calling accounts. The resident account management system 170 may also provide access to other information pertaining to a resident, including for instance a resident's trial schedule, conviction data, criminal record, sentencing data (such as time served, time remaining to be served, and projected release date), cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, the account management system 170 may be one or more separate systems, or may be integrated as a component of the administration and management system 165.

Using the communication services provided by the communication processing system 105, a resident may establish a voice communication session with one or more non-residents. In certain scenarios, a resident may call a non-resident that is using a telephone 130 or other communication device via a Publicly Switched Telephone Network (PSTN) 135. Switch 140, in communication processing system 105, may be used to connect calls across PSTN 135. Additionally or alternatively, the non-resident may establish a voice and/or video visitation session with a resident using a personal communication device 145, which may be a mobile phone, tablet computing device, a personal computer or other communication device. Visitation sessions with a resident using a personal communication device 145 may be connected through a network 150 such as an Integrated Services Digital Network (ISDN), Voice-over-IP (VoIP) network, or packet data network (such as, for example the Internet) and/or a wireless communications network. Router 155 of communication processing system 105 may be used to route data packets associated with a visitation session with personal communication device 145. In certain scenarios, the personal communication device 145 used by the non-resident may include a camera, a display, a microphone and speaker, thus allowing the non-resident to participate in either voice or video visitation sessions with a resident of the controlled-environment facility 110.

In some implementations, communication processing system 105 may be configured to perform various monitoring operations related to visitation sessions. For instance, communications processing system 105 may be configured to allow staff to monitor live voice and video visitation sessions. In addition, communications processing system 105 may record communication sessions, such as by generating audio and/or video files of the visitation session. These recorded visitation sessions may be stored to the database 160 maintained by the administration and management system 165. In certain embodiments, communications processing system 105 may provide access to various tools that can be used to search the recorded visitation session in support of investigative activities.

In the illustrated embodiment, the communications processing system 105 includes a message service 175 that provides residents with messaging services according to various embodiments. As described, a resident may utilize the communication processing system 105 to request a visitation session with a non-resident. In situations where a resident initiates a call request to a non-resident and the non-resident is unable to take the call, the message service 175 provides residents with the ability to record a voice or video message to be made available to the non-resident. The message service 175 then provides the non-resident with the ability to retrieve the recorded message. In particular, the message service 175 dispatches a message to the communication device used by the non-resident, where this message directs the non-resident to the recorded message such that the message can be retrieved and played by the non-resident. In certain embodiments, the message service 175 may also allow a non-resident to record and store voice and/or video messages for later retrieval by a resident.

In the embodiment of FIG. 1, the message service 175 is a component of the communication processing system 105. In certain embodiments, the message service 175 may be an external component of the communications processing system 105. One such embodiment is described with respect to FIG. 2. In certain embodiments, one or more of the functions of the message service 175 may be provided by systems external to the communication processing system 105. In certain of such embodiments, one or more of the functions of the message service 175 may be provided by centralized systems external to the controlled environment facility 110.

Figure 2:
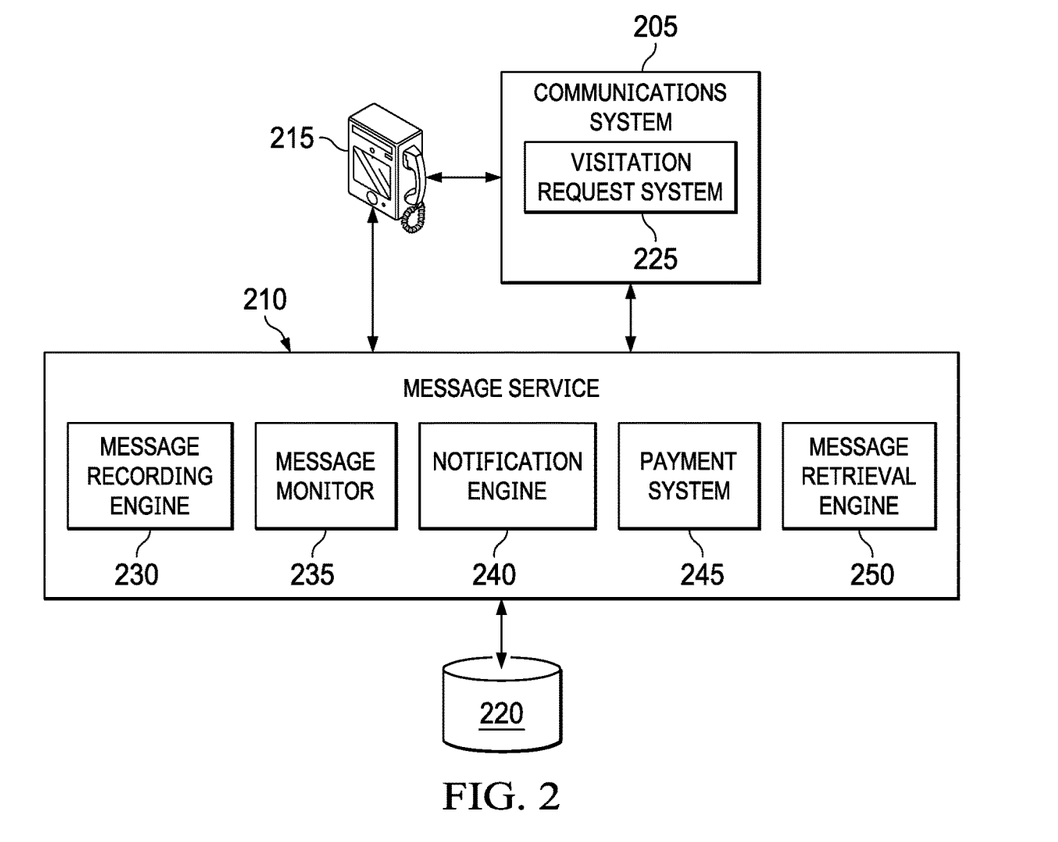
FIG. 2 is a diagram illustrating certain additional components of a system for providing residents of a controlled environment facility with messaging services according to various embodiments.

In the embodiment of FIG. 2, the message service 210 provides similar functions as described with respect to the message service 175 of FIG. 1. In the embodiment illustrated in FIG. 2, the message service 210 is external to the communications system 205. The message service is comprised of several components that interoperate to provide the described messaging service. In various embodiments, one or more the components of the message service 210 may rely on external systems to provide the described functionality. Additionally, various aspects of the functionality of the components of the message service 210 may be provided by the communication system 205 in various embodiments.

In the illustrated embodiment, the message service 210 interfaces with a visitation request system 225 of the communications system 205. The visitation request system 225 receives and processes visitation session requests, such as requests for an audio and/or video visitation. In certain embodiments, the visitation request system 225 may receive and process visitation requests issued by residents or by non-residents. In the illustrated embodiment, the visitation request system 225 receives visitation session requests from a resident using a resident communications terminal 215, such as described with respect to FIG. 1. In other scenarios, the visitation session request may be received by the visitation request system 225 from any type of communication device capable of allowing a resident or a non-resident to participate in visitation sessions provided via the communications system 205.

In the embodiment of FIG. 2, a visitation session request is received from the resident communications terminal 215 by components of the communication session 205. The visitation request system 225 evaluates the request and determines whether the requested visitation is allowed, such as described with respect to FIG. 1. If the requested visitation between the resident and the non-resident is determined to be allowed, the visitation request system 225, in conjunction with other components of the communication system 205, issues a visitation request to the non-resident on behalf of the resident using the resident communications terminal 215.

If the visitation request system 225 determines that the visitation request to the non-resident is not answered or is otherwise not accepted by the non-resident, the visitation request system 225 may forward the resident's visitation request to the message service 210. The message recording engine 230 of the message service 210 may then allow the resident to continue using the resident communications terminal 215 to record a message for the non-resident to retrieve and play. In certain embodiments, a resident will only be provided the opportunity to record a message upon a determination that the resident is authorized to utilize the message service 210. If the resident is allowed to use the message service 210 and chooses to record a message, the message recording engine 230 captures the resident's voice message or video message and stores the message to a repository 220. In certain embodiments, messages may be stored free of charge in the repository 220 for a limited amount of time. By payment of a storage fee, the storage time for a message may be extended. In certain embodiments, payment of a storage fee may be required in order to access and play a stored message.

Upon the resident recording a message for a non-resident, the message service 210 may utilize a notification engine 240 to generate and dispatch a notification of the message to the non-resident. In certain embodiments, the notification engine 240 may rely on an external service in delivering notifications to the non-resident. The notification may direct the non-resident to a website by which the message recorded by the resident can be retrieved and played by the non-resident. In various embodiments, the notification may also include information that identifies the resident that recorded the message. In such embodiments, the notification engine 240 may obtain information identifying the resident via the communications system 205 and may include certain of such identifying information in the notification.

In certain embodiments, the notification delivered to the non-resident directs the non-resident to the message service 210 for retrieval of the recorded message. In certain of such embodiments, the message service 210 may direct the non-resident to a payment system 245. In scenarios where payment is required in order to play a stored message, the payment system 245 receives payment from the nonresident and the repository 220 is updated to indicate the payment of a storage fee associated with the stored message. In certain embodiments, portions of the payment system 245 may be implemented using external systems, such as payment processing systems.

If payment is received or the message service 210 otherwise approves, the message service 210 authorizes a message retrieval engine 250 to retrieve the recorded message from repository 220 and to provide the message for playback by the non-resident. In certain embodiments, the message retrieval engine 250 may provide the device utilized by the non-resident with temporary credentials that can be used to access the repository 220 directly in order to play the recorded message. In certain embodiments, playback of a message by the message retrieval engine 250 may be indicated in the repository 220 in order to track whether a recorded message has been accessed and played by its intended recipient.

As described, the visitation request system 225 receives and processes requests for visitation sessions. If the non-resident chooses to participate, the requested visitation session is conducted between the resident and the non-resident. In certain embodiments, the message monitor 235 may be configured to track the initiation of visitation sessions conducted via the communications system 205. As described in additional detail with respect to FIG. 4, the message monitor 235 may determine whether the initiated visitation session between the resident and the non-resident indicates that one or more message recorded by the resident have been obviated by the visitation session.

For instance, a resident may record a message for a non-resident. In scenarios where, after the message is recorded, the resident and the non-resident participate in a visitation session, the recorded message has been obviated by the visitation session. Any important information present in the recoded message would presumably have been communicated during the conducted visitation session. If the nonresident were to access the message service and play the recorded message after the conducted visitation session, the nonresident may pay a storage fee associated with the message only to find out the message does not include any pertinent information not already communicated during the visitation session. Over time, the resident and the non-resident may learn to avoid playback of such messages obviated by a visitation session. Accordingly, such messages will unnecessarily take up storage space within the repository 220 utilized by the message service 210. As described with respect to FIG. 4, the message monitor 235 may be configured to identify and delete such obviated messages based on conducted visitation sessions.

Figure 3:
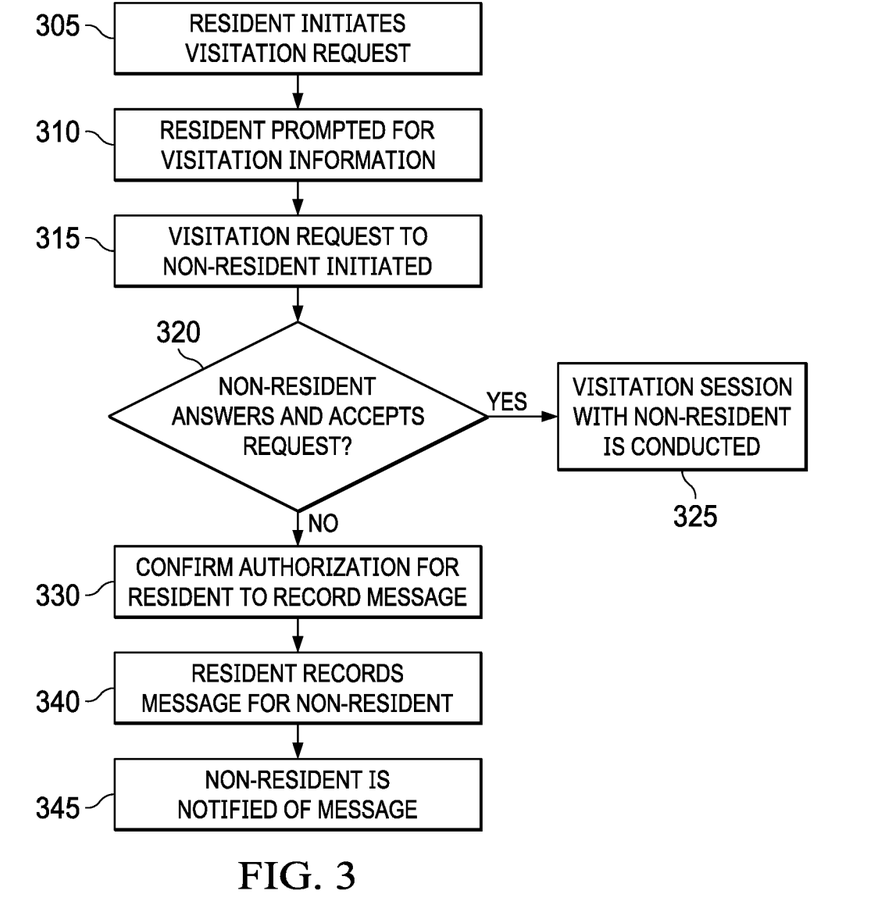
FIG. 3 is a flowchart diagram illustrating certain steps of process according to various embodiments for providing a resident of a controlled environment facility with a message service.

FIG. 3 is a flowchart diagram providing certain steps of a process according to various embodiments, where the process provides a resident of a controlled environment facility with the ability to record a message for retrieval and playback by a non-resident. The process begins at step 305 with the resident initiating the visitation request. Depending on the type of communication device being used by the resident and the policies of the controlled environment facility, the identity of the resident may require confirmation, for instance using a PIN or using voice print, fingerprint, facial recognition, iris scan or other biometric identifiers, in order to issue a visitation request. The resident may then issue a visitation request via a system such as communications system 105, 205 described with respect to FIGS. 1 and 2. In certain embodiments, certain of these functions in receiving and processing visitation session requests may be implemented by the message service 175 and/or visitation request system 225 described with respect to FIGS. 1 and 2, respectively.

At step 310, the communications system may prompt the resident for the identity of the non-resident with which the resident seeks a visitation session. In certain embodiments, the resident may be provided with an interface allowing the selection of contact information for the non-resident that has been approved to participate in visitation sessions with the resident. The communication system may also verify that the resident is not prohibited from contacting the identified non-resident. In certain scenarios, the resident may be required to provide a phone number for the non-resident. In certain scenarios, manual assistance may be provided to the resident in identifying contact information for the non-resident. Upon providing the communication system with contact information for the non-resident, the resident is effectively put on hold. In certain embodiments, the resident is transferred to a conference bridge, to which the non-resident will be transferred if the visitation request is accepted.

With the resident on hold, a visitation session request to the non-resident is initiated at step 315 using the contact information specified by the resident. In certain embodiments, a visitation request is made by message service 175 and/or visitation request system 225 described with respect to FIGS. 1 and 2, respectively. In certain of such embodiments, the visitation request system dials a phone number associated with the non-resident and waits for an answer. If, at step 320, the non-resident's communication device associated with the phone number is used to accept the visitation session request, at step 325, the requested visitation session is conducted, in some cases by transferring the non-resident to the conference bridge where the resident's visitation session remains holding.

If no answer to a dialed call is received before the expiration of a pre-determined time interval, at step 320, the visitation session request is determined as being unanswered and thus not accepted by the non-resident. The time interval may be selected as sufficiently short in duration in order to prevent any voicemail system of the non-resident from answering the visitation session request. In certain scenarios, the non-resident may answer the visitation session request, but decline to participate in the requested visitation session.

In certain embodiments, the visitation request system may utilize an IVR (Interactive Voice Response) system for relaying the visitation session request to a non-resident and determining whether the non-resident chooses to accept the visitation session request. For instance, the IVR system may be used to notify the non-resident regarding the identity of the resident issuing the visitation session request and the controlled environment facility in which the resident is being detained. If the user indicates a denial of the visitation session request, the IVR system may then seek authorization for the resident to record a message for the non-resident to retrieve and play at a later time.

If the resident does not answer or otherwise declines the visitation session request, at step 330, the message service determines whether the resident is authorized to record a message for the non-resident. Certain embodiments may limit a resident's ability to utilize the message service for recording messages based on a privilege status classification associated with the resident. If the resident is authorized, at step 340, the resident may be provided with the opportunity to record a message that will be made available to the non-resident. In certain scenarios, the message service provides the resident with instructions pertaining to recording a message for the non-resident. In certain embodiments, the message recorded by the resident is an audio message. In other embodiments, the resident may be allowed to record a video message for a nonresident.

Once recorded, the message service may utilize various other components of the communication system, such as speech processing and keyword detection tools, to analyze the audio and/or video recorded in each message in order to identify any illicit activities or other unauthorized or suspicious use of the provided visitation services. In certain scenarios, the message recorded by the resident may limited in duration based various factors, such as whether the cost for the message is being paid by the resident or will be paid by the non-resident upon choosing to play the message. The duration of the recorded messages may also be limited based on various restrictions, such as a privilege status of the resident.

Once a message is recorded and analyzed, at step 345, the message service notifies the nonresident of the recorded message. As described with respect to FIG. 2, the message service may utilize various notification mechanisms, such as voicemails, text messages and emails, in order to notify a nonresident of the message and to provide the nonresident with instructions for retrieving and playing the recorded message. The message may also include information in the notification that identifies the resident that recorded the message and contact information for the controlled-environment facility in which the resident is located.

In certain embodiments, a resident may be allowed to record a limited number of messages. In certain instances, a resident may be limited in the number of messages that may be left for a particular nonresident. The resident may also be limited in the total number of unpaid messages that may be stored by the message service on behalf of the resident at any one time. Accordingly, the message service may include an interface by which the resident may choose recorded messages to being deleted.

The message service may store a recorded message for a configurable duration. In certain embodiments, recorded messages will be deleted after a configurable duration unless a fee is paid for the continued storage of the recorded message. In certain embodiments, the resident may be provided with capabilities for interfacing with the message service payment system in order to pay a fee for continued storage of a recorded message. If the nonresident chooses to access a recorded message in response to a notification, certain embodiments may require the nonresident to pay a fee in order to retrieve play message. In such embodiments, the nonresident may be directed to a web page for providing payment information. In certain embodiments, non-residents may be redirected to a third-party payment system.

In certain embodiments, the message service may utilize various functions of the communications system 205 in order to confirm identity of the non-resident seeking to retrieve and play a recorded message. In many controlled environment facilities, residents may be prohibited from contacting certain individuals. In light of such concerns, various forms of authentication may be required from the non-resident before access to a message is granted. In certain embodiments, a voice print of the non-resident may be captured and compared against authorized voice prints associated with the non-resident in order to authenticate the non-resident as a person that is allowed to communicate with the resident. In certain embodiments, the message service may provide an authenticated non-resident with the ability to record a reply message in response to the nonresident playing a message from the resident.

Figure 4:
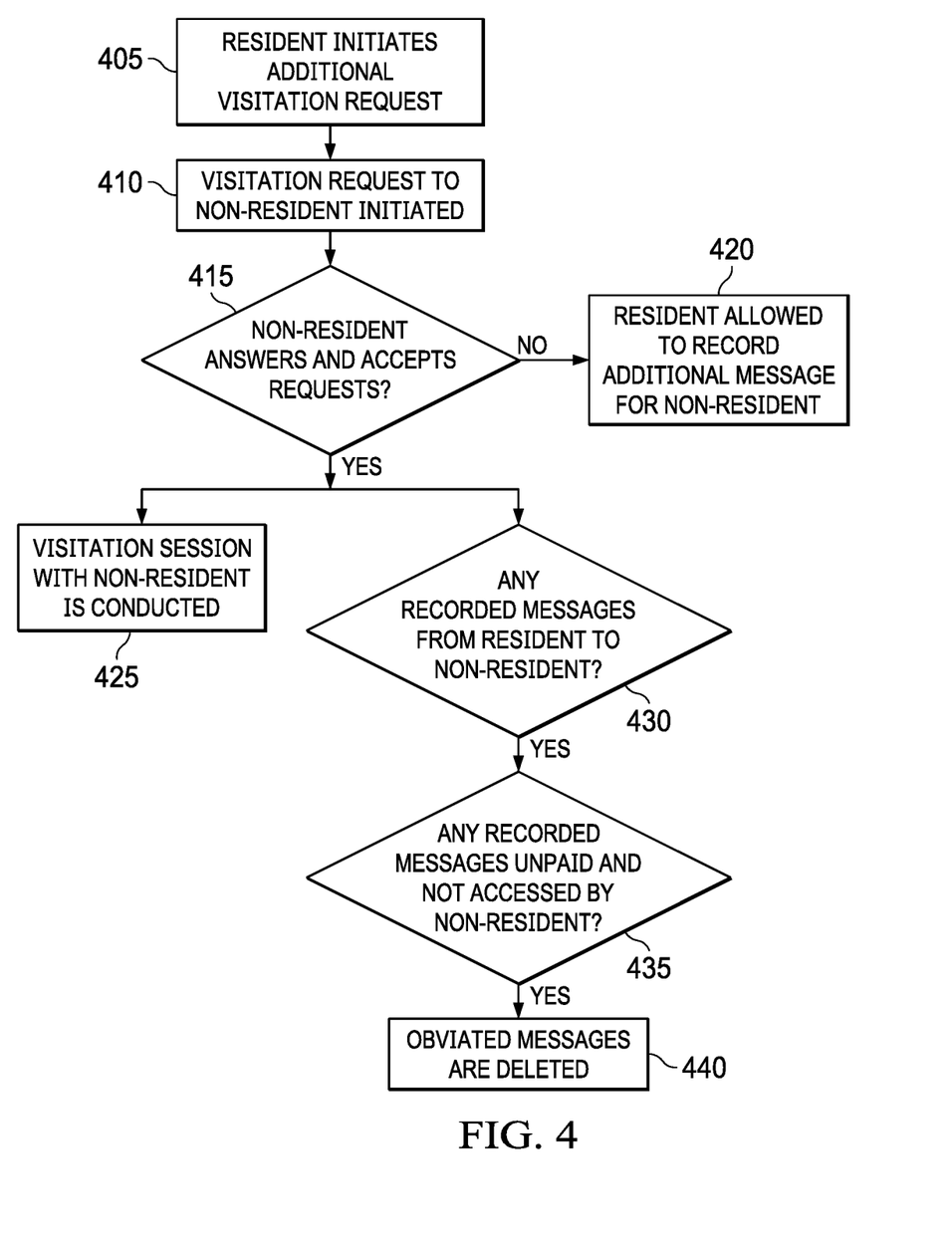
FIG. 4 is a flowchart diagram illustrating certain additional steps of process according to various embodiments for providing a resident of a controlled environment facility with a message service.

Certain embodiments may continue in FIG. 4 with the processing of the messages that are stored by the message service on behalf of a resident. As described, certain communications systems may provide residents with certain cost-free storage of messages that may be accessed and played by a user upon paying the fees for the storage of the message. FIG. 4 describes a process according to certain embodiments for a message service, such as described with respect to FIG. 2, to manage messages that have been recorded by a resident based on the visitation sessions in which the resident has participated. For instance, the message service may be configured to manage recorded messages based on the resident conducting a visitation session with the same nonresident for which the resident has previously recorded a message.

Certain embodiments may begin at step 405 with the resident issuing a visitation request to a nonresident, as described with respect to step 305 of FIG. 3. At step 410, the visitation session request to the non-resident is initiated, such as described with respect to step 310 of FIG. 3. At step 415, the non-resident responds to the visitation session request and decides whether to participate in the requested visitation session, such as described with respect to step 320 of FIG. 3. If the nonresident declines or is otherwise unavailable to participate in the requested visitation session, at step 420, the resident may be allowed to record a message for the non-resident, as described with respect to steps 330, 340 and 345 of FIG. 3.

If the nonresident elects to participate in the requested visitation session, at step 425, the requested visitation session is conducted. Based on the visitation session between the resident and the non-resident, the message service may be configured to manage recorded messages between the resident and the nonresident. In certain scenarios, at step 430, the message service determines whether any of the messages stored on behalf of a nonresident are messages that have been recorded for retrieval by the same nonresident participating in the visitation session of step 425. For all such stored messages that are identified, at step 435, the message service be further configured to identify any such messages for which storage fees have been paid. Any such messages with a paid storage fee are not deleted at this time. In certain scenarios, the message service may additionally determine whether the nonresident has accessed and played each of the recorded messages between these two participants.

At step 440, the message service may delete certain of the recorded messages between the nonresident and the resident. In certain embodiments, the message service may delete all recorded messages between the nonresident the resident for which no storage fee has been made. In certain embodiments, the message service may also retain all messages recorded by the resident for the nonresident that have been accessed and played by the nonresident. All such messages that have either unpaid storage fees or have never been played by the nonresident presumably include information that is being relayed during the visitation session of step 425 between these same individuals. If the nonresident were to pay storage fees in order to access and play such messages, the nonresident may be paying to receive information that has already been relayed during a the conducted visitation session. In addition, by deleting all such messages as soon as they are obviated by a visitation session, the costs associated with storing messages unnecessarily is reduced.

Figure 5:
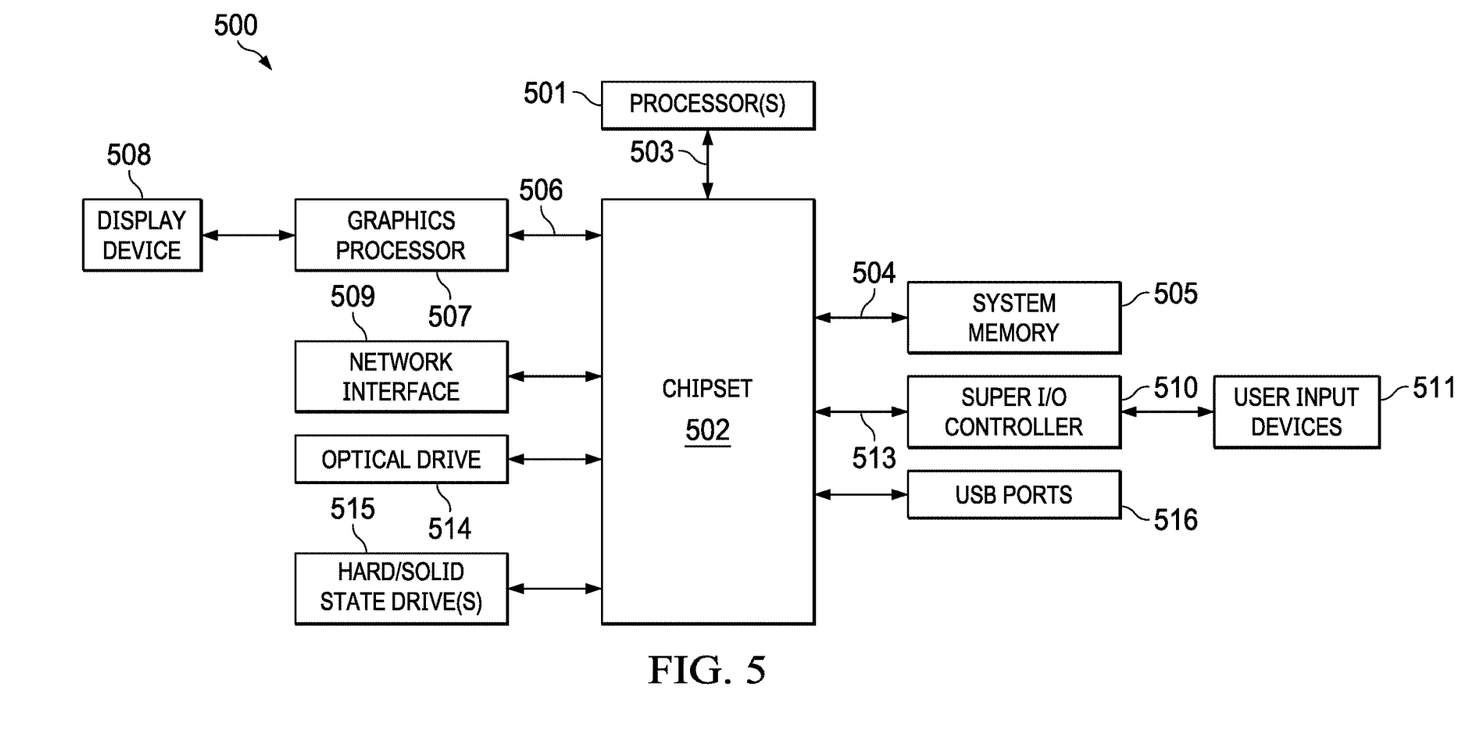
FIG. 5 is a block diagram illustrating certain components of a communication processing system used to implement a message service in a communication system according to various embodiments.

FIG. 5 is a block diagram of a communication processing system 500 configured according to certain embodiments to support the described voice messaging system. Communication processing system 500 may include one or more processors 501. In various embodiments, communication processing system 500 may be a single-processor system including one processor 501, or a multi-processor system including two or more processors 501. Processor(s) 501 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communication processing system 500 includes a chipset 502 that may include one or more integrated circuits that are connected to processor(s) 501. In certain embodiments, the chipset 502 may utilize a QPI (QuickPath Interconnect) bus 503 for communicating with the processor(s) 501. Chipset 502 provides the processor(s) 501 with access to a variety of resources. For instance, chipset 502 provides access to system memory 505 over memory bus 504. System memory 505 may be configured to store program instructions and/or data accessible by processors(s) 501. In various embodiments, system memory 505 may be implemented using any suitable memory technology, such as static RAM (SRAM), synchronous dynamic RAM (SDRAM), nonvolatile/Flash-type memory, or any other type of memory.

Chipset 502 may also provide access to a graphics processor 507. In certain embodiments, graphics processor 507 may be comprised within one or more video or graphics cards that have been installed as components of the communication processing system 500. Graphics processor 507 may be coupled to the chipset 502 via a graphics bus 506 such as provided by an AGP (Accelerated Graphics Port) bus, a PCIe (Peripheral Component Interconnect Express) bus. In certain embodiments, graphics processor 507 generates display signals and provides them to a display device 108 that may be coupled directly to the communication processing system 500 or may be located remotely from the communication processing system 500.

In certain embodiments, chipset 502 may also provide access to one or more user input devices 511. In such embodiments, chipset 502 may be coupled to a super I/O controller 510 that provides interfaces for a variety of user input devices 511, in particular lower bandwidth and low data rate devices. For instance, super I/O controller 510 may provide access to a keyboard and mouse or other peripheral input devices. In certain embodiments, super I/O controller 510 may be used to interface with coupled user input devices 511 such as keypads, biometric scanning devices, and voice or optical recognition devices. The user input devices 511 may interface with super I/O controller 510 through wired or wireless connections. In certain embodiments, the super I/O controller 510 may be coupled to the super I/O controller 510 via a Low Pin Count (LPC) bus 513.

Other resources may also be coupled to the processor(s) 501 of the communication processing system 500 through the chipset 502. In certain embodiments, chipset 502 may be coupled to a network interface 509, such as provided by a Network Interface Controller (NIC) that is coupled to the communication processing system 500. In certain embodiments, the network interface 509 may be coupled to the chipset 502 via a PCIe bus. According to various embodiments, network interface 509 may support communication via various wired and/or wireless networks. Chipset 502 may also provide access to one or more hard disk and/or solid state drives 515. In certain embodiments, the chipset 502 may also provide access to one or more optical drives 514 or other removable-media drives. Any or all of the drive devices 514 and 515 may be integral to the communication processing system 500, or may be located remotely from the communication processing system 500. In certain embodiments, the chipset 502 may also provide access to one or more Universal Serial Bus (USB) ports 516.

In various embodiments, a communication processing system 500 does not include each of the components shown in FIG. 5. In various embodiments, a communication processing system 500 may include various additional components in addition to those that are shown in FIG. 5. Furthermore, some components that are represented as separate components in FIG. 5 may in certain embodiments instead be integrated with other components. For example, in certain embodiments, all or a portion of the functionality provided by the illustrated components may instead be provided by components integrated into the one or more processor(s) 501 as a systems-on-a-chip.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for providing a resident of a controlled-environment facility with messaging, the system comprising:
   a communications system configured to host an electronic visitation session between the resident of the controlled-environment facility and a non-resident; and
   an electronic message service configured to:
      record one or more messages, the messages recorded by the resident of the controlled-environment facility and directed to the non-resident, the messages recorded according to restrictions that are based on a privilege status of the resident within the controlled-environment facility, the one or more messages recorded prior to the visitation session;
      identify a plurality of stored messages recorded prior to the visitation session based on whether the stored messages have been accessed by the non-resident; and
      delete the identified plurality of stored messages recorded prior to the visitation session that have not been accessed by the non-resident.

2. The system of claim 1, wherein the messages are recorded by the resident from an allotment of messages that the resident is authorized to record.

3. The system of claim 2, wherein number of messages in the allotment is determined based on the privilege status of the resident.

4. The system of claim 1, wherein the plurality of stored messages are further identified based on whether a fee has been paid for storage of the messages, and wherein stored message are not deleted when a fee has been paid for storage of the messages.

5. The system of claim 1, wherein a duration of the one or more recorded messages may be limited based on the privilege status of the resident.

6. The system of claim 1, wherein messages are recorded by the resident in response to non-accepted visitation session requests issued to the non-resident on behalf of the resident.

7. The system of claim 6, wherein the visitation session request is issued by the resident via a terminal provided by the controlled-environment facility.

8. The system of claim 7, wherein the message service authorizes continued use of the terminal by the resident to record a message for the non-resident in response to the non-accepted visitation session request.

9. A method for providing a resident of a controlled-environment facility with messaging, the method comprising:
   recording one or more electronic messages, wherein the messages are recorded by the resident of the controlled-environment facility and are directed to a non-resident, and wherein the messages are recorded according to restrictions that are based on a privilege status of the resident within the controlled-environment facility;
   hosting an electronic visitation session between the resident and the non-resident;
   determining the one or more messages are recorded prior to the visitation session conducted between the resident and the non-resident;
   identifying a plurality of stored messages recorded prior to the visitation session based on whether the stored messages have been accessed by the non-resident; and
   deleting the identified plurality of stored messages recorded prior to the visitation session that have not been accessed by the non-resident.

10. The method of claim 9, wherein the messages are recorded by the resident from an allotment of messages that the resident is authorized to record.

11. The method of claim 10, wherein number of messages in the allotment is determined based on the privilege status of the resident.

12. The method of claim 9, wherein the plurality of stored messages are further identified based on whether a fee has been paid for storage of the messages, and wherein stored message are not deleted when a fee has been paid for storage of the messages.

13. The method of claim 9, wherein a duration of the one or more recorded messages may be limited based on the privilege status of the resident.

14. The method of claim 9, wherein messages are recorded by the resident in response to non-accepted visitation session requests issued to the non-resident on behalf of the resident.

15. The method of claim 14, wherein the visitation session request is issued by the resident via a terminal provided by the controlled-environment facility.

16. The method of claim 15, wherein the message service authorizes continued use of the terminal by the resident to record a message for the non-resident in response to the non-accepted visitation session request.

17. A non-transitory computer-readable storage device having program instructions stored thereon for providing a resident of a controlled-environment facility with messaging, upon execution by a one or more processors, the program instructions cause the one or more processors to:
   record one or more electronic messages, wherein the messages are recorded by the resident of the controlled-environment facility and are directed to a non-resident, and wherein the messages are recorded according to restrictions that are based on a privilege status of the resident within the controlled-environment facility;
   host an electronic visitation session between the resident and the non-resident;
   determine the one or more messages are recorded prior to the visitation session conducted between the resident and the non-resident;
   identify a plurality of stored messages recorded prior to the visitation session based on whether the stored messages have been accessed by the non-resident; and
   delete the identified plurality of stored messages recorded prior to the visitation session that have not been accessed by the non-resident.

18. The computer-readable storage device of claim 17, wherein the messages are recorded by the resident from an allotment of messages that the resident is authorized to record.

19. The computer-readable storage device of claim 18, wherein number of messages in the allotment is determined based on the privilege status of the resident.

20. The computer-readable storage device of claim 17, wherein the plurality of stored messages are further identified based on whether a fee has been paid for storage of the messages, and wherein stored message are not deleted when a fee has been paid for storage of the messages.

* * * * *